March 7, 1950 S. MISIC 2,499,928
FOOD MIXER ELECTRIC MOTOR ASSEMBLY
Filed June 3, 1947 2 Sheets-Sheet 1
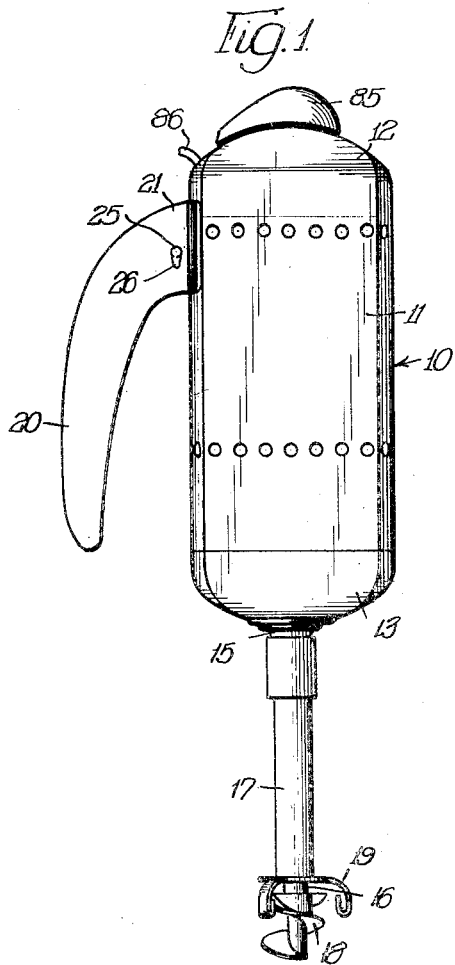
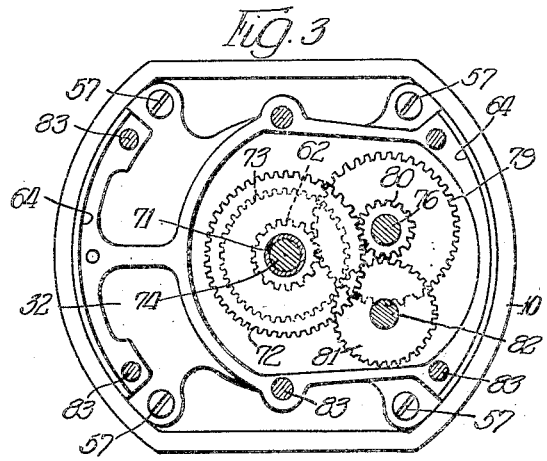
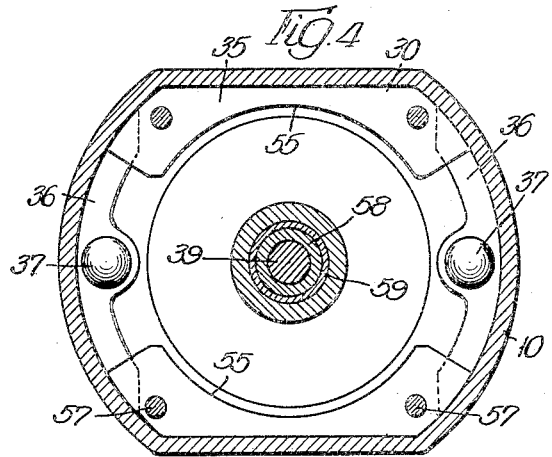
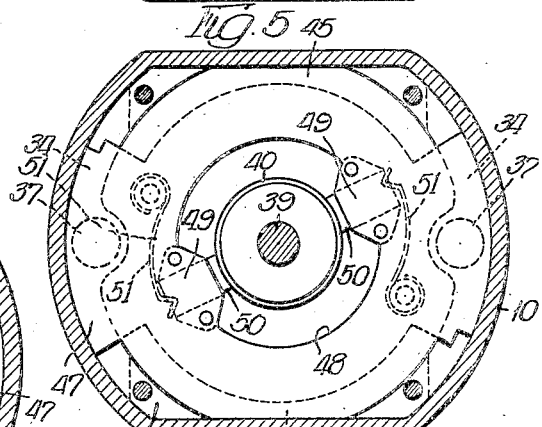
INVENTOR.
Stephen Misic,
BY Cromwell, Greist & Warden
ATTYS March 7, 1950 S. MISIC 2,499,928
FOOD MIXER ELECTRIC MOTOR ASSEMBLY
Filed June 3, 1947 2 Sheets-Sheet 2
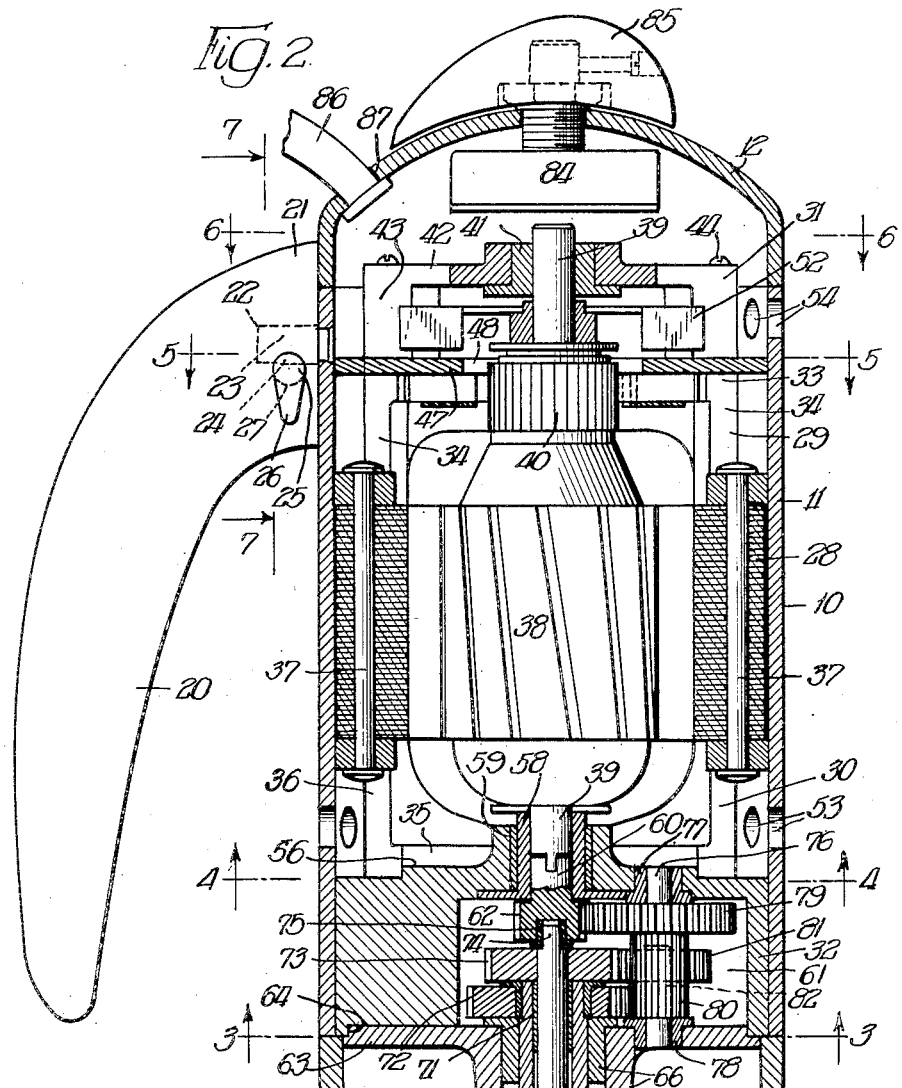
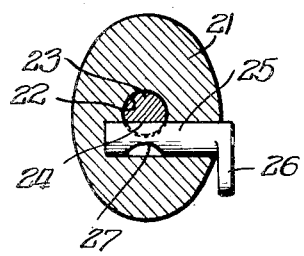
INVENTOR.
Stephen Misic,
BY
Cromwell, Greist + Warden
attys Patented Mar. 7, 1950

2,499,928

UNITED STATES PATENT OFFICE 2,499,928

FOOD MIXER ELECTRIC MOTOR ASSEMBLY

Stephen Misic, Berwyn, Ill., assignor to Franklin Appliance Company, Chicago, Ill., a corporation of Illinois Application June 3, 1947, Serial No. 752,232

6 Claims. (Cl. 172—36)

This invention is concerned with improvements in a food mixer.

It is an object of the invention to provide a food mixer of the portable hand-manipulated type which is simple, compact, light in weight, yet of rugged construction, and which will efficiently mix various kinds of materials having varying viscosities.

A more specific object of the invention is to provide a food mixer comprising a light, compact driving motor having secured, at opposite ends and axially of the driving shaft, bearing supporting structures, one of which provides for supporting a fan at that end of the motor and the other of which provides a compartment at the opposite end of the motor accommodating driving gears for rotating in opposite directions concentrically mounted beater shafts, the compartment being closed by a plate on which the gears and the connecting drive mechanism for the beater shafts are supported.

A further object of the invention is to provide a food mixer of the type described in which a driving motor, a cooling fan and gear mechanism for driving concentrically arranged beater shafts are operatively associated by supporting structures which are adapted to be secured to each other in alignment and which comprise separable elements provided with closely interfitting portions whereby the motor and the supporting structures may be readily assembled in properly aligned relation by moving the separable elements axially into position and then interengaging the same with a snap action.

It is another object of the invention to provide in a food mixer construction a driving motor and a driving mechanism for concentrically arranged beater shafts which are arranged so that vibrationless operation of the beater shafts is obtained.

It is another object of the invention to provide a food mixer mechanism for driving concentrically arranged beater shafts wherein the motor shaft and the beater shafts are supported in axial alignment with the end of the inner beater shaft journaled in the end of the motor shaft to thereby eliminate chattering in the beater shafts.

It is another object of the invention to provide in a food mixer a casing having a central section and separable end sections wherein the central section of the casing is adapted to receive a driving motor supporting unit having incorporated in one end a cooling fan and in the other end a gear driving mechanism for concentrically arranged beater shafts and wherein the end sections of the casing may be removed to provide access to the respective ends of the motor supporting unit.

It is another object of the invention to provide in a portable mixer a separable handle member which may be readily attached to or detached from the mixer casing by a simple latch mechanism.

These and other objects and advantages will be apparent from a description of the preferred form of the food mixer which is shown, by way of illustration, in the accompanying drawings, wherein:

Fig. 1 is a side elevation of a food mixer embodying the principles of the invention;

Fig. 2 is a longitudinal section through the mixer casing, to an enlarged scale;

Fig. 3 is a section on the line 3—3 of Fig. 2;
Fig. 4 is a section on the line 4—4 of Fig. 2;
Fig. 5 is a section on the line 5—5 of Fig. 2;
Fig. 6 is a section on the line 6—6 of Fig. 2; and
Fig. 7 is a section on the line 7—7 of Fig. 2.

Referring to the drawings, the mixer construction comprises a casing or housing 10 which is adapted to enclose a driving motor, speed control mechanism for the motor and gear mechanism for connecting the motor shaft in driving relation to the inner ends of short concentric shafts, the beater shafts being adapted to be connected to the outer ends of the short connecting shafts for rotation thereby when the motor is operated.

The casing 10 includes a central section or main portion 11 and end sections 12 and 13. The central section 11 houses the motor, a cooling fan and a gear mechanism for driving the beater shafting, all of which are initially assembled as a single unit and inserted in the casing. The top end section 12 supports the speed control mechanism and encloses the top end of the motor unit. The bottom end section 13 encloses the lower end of the motor unit and is provided with a central aperture 14 through which the shaft structure 15 extends for connecting the motor shaft in driving relation with the beater shafts. The casing sections 11, 12 and 13 are secured to each other by screws or similar securing means. The motor unit is secured within the casing 10 by any conventional fastening means.

The mixer mechanism is adapted to rotate, in opposite directions, concentrically arranged inner and outer beater shafts 16 and 17, respectively. The inner beater shaft 16 is provided at its lower end with a mixing screw element 18 and the outer beater shaft 17 is provided with a cooperating mixing element 19. The beater shafts 16 and 17 are adapted to be detachably secured on the connecting shaft structure 15 which extends downwardly through the aperture 14 in the casing section 13. The beater construction and the mechanism for detachably securing the same to the connecting shaft structure 15 are more fully described in applicant's copending application, Serial No. 729,113, filed February 17, 1947.

The mixer is adapted to be supported by a handle 20 which is detachably connected to the casing 10 and which is proportioned and shaped to provide for comfortably holding the mixer in any desired position with the least amount of fatigue. The upper end 21 of handle 20 conforms to the contour of the casing 10 and is provided with a recess or bore 22 which is adapted to receive a securing pin 23. The pin 23 is fixed to and extends outwardly of section 11 of the casing. The pin 23 is provided with a transverse groove 24 which accommodates a transverse latching pin 25 journaled in the handle end 21. The latching pin 25 is operable by a handle member 26 and is provided with a transverse groove 27. When the handle 20 is positioned with the securing pin 23 seated in the recess 22 and the latching pin 25 in normal latching position, the handle is securely latched to the casing by engagement of the latching pin 25 in the groove 24 in the securing pin 23. The handle 20 may be removed by rotating the latching pin 25 180 degrees to bring the groove 27 into position to accommodate the securing pin 23 and permit withdrawal of securing pin 23 from the recess 22. With the handle 20 removed the casing may be secured to any other supporting means such as a supporting stand, or it may be grasped in the hand and held directly by the user.

The motor unit which is housed in the central section 11 of the casing 10 comprises the motor body or laminated stator core structure 28, spacing bracket members 29 and 30 extending in opposite directions therefrom and bearing bracket members 31 and 32, respectively. The bracket members 29, 30, 31 and 32 are preferably castings of light metal, such as aluminum.

The bracket member 29 consists of a plate-like top portion 33 and depending legs or feet 34. The bracket 30 consists of a plate-like bottom portion 35 and upstanding legs or feet 36. The legs 34 and 36 of brackets 29 and 30, respectively, are U-shaped and provided with laterally extending bright portions which are apertured to receive bolts or rivets 37 by means of which the brackets are rigidly secured to the motor laminations 28. The laminated structure 28 and the spacing brackets 29 and 30 are arranged to accommodate the motor armature 38 having shaft 39 and commutator 40.

The upper end of the motor shaft 39 is journaled in a self-lubricating bearing 41 which is mounted in the top or end plate portion 42 of supporting bracket member 31. Depending legs 43 on bracket member 31 engage the top plate 33 of the spacing bracket 29 and are secured thereto by screws 44. The top plate 33 of spacing bracket 29 is provided with shelf or ledge portions 45 which cooperate with similar shelf or ledge portions 46 on the engaging portions of legs 43 of bracket 31 to accommodate the brush holder supporting plate 47.

Plate 47 is provided with a central aperture 48 in which the commutator 40 rotates. The aperture 48 is larger in diameter than the commutator 40 and provides a path for air circulation. Brush holders 49 are secured on the lower face of plate 47 for receiving the brushes 50 which are held in engagement with the commutator 40 by spring members 51 secured on the plate 47. The plate 47 is held in position between the bracket members 29 and 31 and a close interlocking fit is provided so that when positioned in proper alignment and moved axially toward bracket 29, plate 47 will snap into position on the ledge portions 45 and when bracket 31 is positioned thereover and moved toward bracket 29 it will snap into properly seated position. Portions of plate 47 extend radially between the legs 34 of the bracket 29 and legs 43 of bracket 31 so that plate 47 will not rotate out of its initial set position and brushes 50 are maintained in proper predetermined circumferential position relative to the commutator 40.

The top plate portion 42 of bracket 31 is spaced a sufficient distance from the top plate portion 33 of the bracket 29 to accommodate a multi-blade fan 52 which is keyed to the motor shaft 39 and rotates therewith to circulate air within the casing 10. The casing 10 is provided with a series of air holes 53 in the lower end adjacent the end of the armature 38 and another series of air holes 54 in the upper end adjacent the periphery of the fan 52. The fan 52 draws air through holes 53, circulates it around the armature 38 and commutator 40, through the aperture 48 in plate 47 and out the holes 54 and prevents overheating of the motor.

The bottom plate portions 35 of spacing bracket 30 are provided with inner shoulder forming portions 55 for receiving in close fitting interengaging relation projecting top plate portion 56 of the bearing bracket 32. The bracket 32 is secured to the bracket 30 by means of screws 57. The bracket 32 supports a self-lubricating bearing 58 in a bushing 59. The lower end of the motor shaft 39 is journaled in the bearing 58 and extends a short distance therein. A floating shaft section 60 is provided with one end extending into the bearing 58 and into abutting relation with the lower end of the motor shaft 39. Interengaging portions on the abutting ends of the shafts separably connect the shafts so that shaft section 60 is rotatably driven by the motor shaft 39 and forms an end extension thereon. The other end of shaft section 60 projects into an outwardly opening gear compartment 61 in the bracket 32 and a driving pinion 62 is secured in fixed relation thereon.

A plate member 63 is adapted to close the bottom end of compartment 61. The bracket 32 is provided with peripheral recess forming shoulder portions 64 having a close interlocking fit with peripheral portions of plate 63.

Plate 63 is provided with a downwardly extending central hub 65 having secured therein a two-part self-lubricating bearing 66 in which are journaled relatively short sections of concentric outer and inner shafting 67 and 68, respectively. An oil seal 69 and retaining ring 70 are provided at the lower end of bearing 66. The shaft sections 67 and 68 which are separated from each other by bearing 71 extend downwardly and constitute part of the beater shaft connecting structure 15.

The outer shaft section 67 has secured on its upper end a fiber gear 72. The inner shaft section 68 projects upwardly beyond the end of outer shaft section 67 and has secured on its upper end a metal gear 73. The shaft section 68 has a reduced end portion 74 which is journaled in a bearing 75 in an axial recess formed in the lower end of floating shaft 60. By means of this construction the rotating shafts are held in substantially perfect alignment and there is no chattering in the beater shafts.

A shaft 76 is journaled at one end in the bearing 77 in the wall of compartment 61 and at the other end in the bearing 78 in the cover plate 63. A fiber gear 79 is secured on shaft 76 and meshes with pinion 62 on the floating shaft 60, being driven thereby. A relative wide pinion 80 is secured on the shaft 76 and meshes with gear 72 on the connecting shaft section 67 to rotate the outer beater shaft. The pinion 80 also meshes with a fiber gear 81 which is mounted on a stub shaft 82 projecting from the plate 63. The gear 81 meshes with the gear 73 on the connecting shaft section 68 to rotate the inner beater in the opposite or reverse direction to the direction of rotation of the outer beater.

The cover plate 63 is secured to the bracket member 32 by means of screws 83 or the like and completely closes the compartment 61. The compartment 61 may be filled with grease or other lubricating material prior to being closed by the plate 63.

The upper end section 12 of the casing 10 supports a speed control device for the motor which preferably comprises a multi-point switch 84 for controlling the motor field winding and thus varying the speed of the motor. An operating knob or handle member 85 is provided on the end of the casing section 12 and a cooperating dial or other markings may be provided to indicate the position of the same for various motor speeds. A current supply cord 86 of appropriate length extends through an aperture 87 in the casing section 12 and provides for supplying current to operate the motor.

The arrangement of the motor body, the spacing brackets and the bearing supporting brackets so that they may be easily and quickly separated from each other not only adapts the device to rapid and economical manufacture but also greatly reduces the cost of maintenance since all the parts are readily accessible for examination, repair and replacement. The driving gear mechanism may be entirely removed without disassembly of the motor by removing casing section 13 and separating bracket 32 from the spacing bracket 30.

While specific materials and details of construction have been referred to in describing the illustrated form of the invention, it will be understood that other materials and other details of construction within the spirit of the invention may be resorted to.

I claim:

1. In a food mixer, a motor stator core, spacer brackets connected to said stator core, motor shaft bearing holders connected to said spacer brackets, one of said bearing holders having a compartment, a motor shaft extension projecting into said compartment and being separable from the motor shaft, a cover plate for said compartment, concentric beater shaft driving members journaled in said cover plate with their axes in alignment with the motor shaft, and gear drive mechanism for rotating said beater shaft driving members from the motor shaft, the end of one of said beater shaft driving members being journaled in the end of said motor shaft extension.

2. In a food mixer, a motor stator core, brackets extending from opposite sides of said stator core and supporting motor shaft bearings, one of said brackets having a compartment adjacent the shaft bearing, a cover for said compartment, concentric beater shaft connecting members journaled in said cover and extending into said compartment, a relatively short floating shaft section in said shaft bearing having one end extending into said compartment, a bearing in said end of said floating shaft for receiving the end of the inner one of said concentric beater shaft connecting members and gear members connecting said floating shaft section and said beater shaft connecting members in driving relation, said floating shaft being provided with separable means for connecting the same to the motor shaft.

3. A food mixer comprising a motor stator core, spacer members secured to each side of said motor stator core and motor shaft bearing supporting members secured to said spacer members, one of said supporting members having a gear drive receiving compartment and a cover plate member for said compartment, said spacer members and said bearing supporting members having close interfitting portions on their engaging sides whereby when said interfitting portions are aligned and said bearing supporting members are moved axially relative to said spacer members they will engage in close frictionally interlocked relation with a snap action.

4. A food mixer comprising a motor stator core, separable bracket members attached to opposite sides of said motor stator core, motor shaft bearing members in said bracket members, a gear compartment in one of said bracket members at one end of said motor shaft, a bearing in said compartment in alignment with the motor shaft bearing members, relatively short concentric drive members for beater shafts journaled in said bearing and extending into said compartment, driving gears in said compartment connecting said motor shaft to said drive members and a fan supported on the motor shaft in the other one of said bracket members.

5. A food mixer as claimed in claim 4 wherein a floating extension member is separably connected to the end of the motor shaft and the inner end of one of said drive members is journaled in the aligned end of said motor shaft extension member.

6. A food mixer construction comprising a casing having air holes at opposite ends, a motor stator core positioned in said casing intermediate said air holes, said motor stator core having spacer brackets and bearing supporting brackets attached to opposite ends thereof, a fan secured on the shaft of said motor adjacent one end thereof, and a brush holder supporting plate secured between the spacer bracket and bearing supporting bracket at one end of said stator core, said plate having a central aperture providing an air passage around the motor commutator whereby air is drawn by said fan through the holes at one end of the casing around the motor windings and through said apertured plate to said holes in the opposite end of said casing and said motor stator core, spacer and supporting brackets, fan and brush holder being readily removable from said casing as a unit.

STEPHEN MISIC.

REFERENCES CITED

The following references are of record in the file of this patent:

UNITED STATES PATENTS

| Number | Name | Date |
|---|---|---|
| 964,197 | Backscheider | July 12, 1910 |
| 1,423,406 | Donlevy | July 18, 1922 |
| 1,442,217 | Doubler | Jan. 16, 1923 |
| 1,525,691 | Poth | Feb. 10, 1925 |
| 2,170,036 | Schumann | Aug. 22, 1939 |
| 2,179,745 | Koenner | Nov. 14, 1939 |
| 2,244,406 | Schonwald | June 3, 1941 |
| 2,292,567 | Jordon | Aug. 11, 1942 |
| 2,293,959 | Wright | Aug. 25, 1942 |
| 2,317,098 | Gough | Apr. 20, 1943 |

FOREIGN PATENTS

| Number | Country | Date |
|---|---|---|
| 429,333 | Great Britain | May 28, 1935 |
| 584,870 | Germany | Sept. 25, 1933 |